United States Patent [19]

Smith

[11] Patent Number: 4,543,366

[45] Date of Patent: Sep. 24, 1985

[54] SPRAYABLE URETHANE RESIN COMPOSITION AND METHOD

[75] Inventor: Stuart B. Smith, Conyers, Ga.

[73] Assignee: Thermocell Development, Ltd., Knoxville, Tenn.

[21] Appl. No.: 660,908

[22] Filed: Oct. 15, 1984

Related U.S. Application Data

[63] Continuation-in-part of Ser. No. 649,136, Sep. 10, 1984, abandoned.

[51] Int. Cl.<sup>4</sup> ............................................. C08G 18/14
[52] U.S. Cl. ..................................... 521/78; 427/180; 427/181; 427/202; 427/203; 427/204; 427/206; 427/236; 427/387; 427/421; 427/426; 428/423.1; 521/117; 521/122; 521/123; 521/124; 521/127; 521/137; 521/159; 521/167; 524/786; 524/874; 525/460; 528/55; 528/58; 528/60; 528/77; 528/78
[58] Field of Search ................ 521/78, 117, 122, 123, 521/124, 127, 137, 159, 167; 524/874, 786; 525/460; 528/55, 58, 60, 77, 78; 427/180, 181, 202, 203, 204, 206, 236, 387, 421, 426; 428/423.1

[56] References Cited

U.S. PATENT DOCUMENTS 4,289,684  9/1981  Kalloun ............................. 523/527

Primary Examiner—Maurice J. Welsh
Attorney, Agent, or Firm—Richard P. Crowley

[57] ABSTRACT

Sprayable urethane resin compositions and a process for preparing the sprayable resin compositions particularly with reinforcing materials such as chopped fiberglass, which process comprises reacting generally equal volumes of A and B side mixtures in a sprayable reaction to form a fast reacting, fast curing urethane resin, the A side mixture comprising an MDI or an MDI prepolymer prepared by reacting an MDI with a triol and a B side mixture comprising an auto catalytic, aromatic amine polyol having a hydroxyl number ranging from about 300 to 600, a viscosity reducing amount of a tetraethylene glycol and a catalyst to affect the rapid reaction and cure of the A and B side mixtures on spraying, the process may optionally include the incorporation of reinforcing materials, such as glass fibers and optionally may include the use of blowing agents to provide a lower density reinforced cured product.

28 Claims, No Drawings

SPRAYABLE URETHANE RESIN COMPOSITION AND METHOD

REFERENCE TO PRIOR APPLICATIONS

This application is a continuation-in-part of U.S. patent application Ser. No. 649,136, filed Sept. 10, 1984 and now abandoned, entitled Sprayable Urethane Resin Composition and Method, which patent application is hereby incorporated by reference.

BACKGROUND OF THE INVENTION

There is a considerable market for unsaturated polyester resins with the great majority of the present market comprising spraying an unsaturated polyester resin typically with reinforcing materials, more particularly chopped fiberglass, onto a polyester gel coat in order to provide a fabricated product of high strength. Generally the unsaturated resin composition is sprayed in an open or contact molding process to produce an exterior molded surface formed by a gel coat of the polyester resin, while an additional polyester resin coat is sprayed over the gel coat or more particularly reinforcing fibers such as glass fibers are rolled into the gel coat in the gel condition. Such open molding processes generally are designed to achieve polyester resin cured at ambient or slightly elevated temperatures under little or no pressure. The fabrication of products employing a sprayed, unsaturated polyester resin particularly with reinforcing glass fibers is generally directed to marine use such as the preparation of boat hulls or consumer products such as for example the preparation of tub or shower stalls and other erosion-resistant fabricated products of high strength and light weight.

The polyester resin formulation is generally an unsaturated polyester based resin dissolved in a monomer such as styrene and typically contains an inhibitor to provide shelf life and a catalyst like a peroxide such as methyl ethyl ketone. The unsaturated resin is a condensation polymer prepared by a reaction between an acid and an alcohol. Generally dibasic acids are used such as maleic anhydride or fumaric acid together with the use of neopentyl glycol. The resin is sprayed with reinforcing materials such as fibrous or clay-type particulate materials as reinforcing agents or fillers and more particularly with chopped fiberglass gun roving. For example, a fabricated polyester material may be prepared by spraying the unsaturated polyester resin with the chopped fiberglass gun rovings onto a previously sprayed polyester gel coat with the polyester gel coat forming generally the smooth exterior surface of the fabricated product. After spraying of the polyester resin with the fiberglass, the material in the chopped glass must be rolled in order to saturate the glass into the gel coat and to smooth out the fabricated material. Various promoters such as cobalt salts may be added to the polyester resin in order to speed up reaction times. Such promoters may be used in combination with the methyl ethyl ketone catalyst or other catalyst systems. The process of preparing the unsaturated polyester resin fabricated material is quite slow and very labor intensive. In addition, many of the polyester resin compositions contain styrene as a monomer which is a toxic material; and therefor, the spraying process must be carried out with caution and with adequate safety for the workers.

It is desired to provide for a spray coating to be employed in the place of unsaturated polyester resin spray coatings or in combination therewith, particularly spray coats that may be placed directly over a gel coat with or without the use of reinforcing fibers and wherein the cure times of the resin are reduced, glass roll out is avoided and with a reduction in labor as well as the avoidance of styrene monomeric material.

SUMMARY OF THE INVENTION

The invention relates to a sprayable urethane resin composition and to the method of preparing and using such sprayable urethane resin compositions. More particularly the invention concerns a sprayable resin composition which may be sprayed in fixed-volume spray equipment and which resin composition cures rapidly and which may be used in place of sprayable unsaturated polyester resins.

The invention comprises a novel urethane resin composition and system wherein the resin composition may be sprayed in a similar manner as the polyester resin compositions incorporating reinforcing fibers such as chopped fiberglass and which sprayable urethane resin composition and system provides for significant advantages over the use of polyester resin systems. The urethane resin system of the invention provides for rapid reaction and cure times in minutes and typically less than 5 minutes to gel and generally less than 10 to 15 minutes to a tack-free condition. The sprayable urethane resins of the invention also provide for a good wetting of a reinforcing fiber particularly chopped fiber glass avoiding the problems associated with glass roll out present in the prior art polyester resin systems. The urethane resin systems do not contain styrene or styrene based monomers and may be produced by employing foaming agents to produce a lower density, but high strength resin coating. The sprayable urethane resin systems of the invention thereby provide for reduction in labor and an increase in productivity and permit the reductions in the weight of the spray coatings.

The sprayable urethane systems have been designed specifically as a spray coating which may be employed in the place of unsaturated polyester resin compositions. The unique chemical composition of the urethane composition allows such material to accept chopped or milled glass and other reinforcing fillers and fibers generally up to a weight of 30 percent by weight of the composition. The sprayable urethane resins can be applied directly to a substrate or over a gel coat with or without reinforcing fibers such as glass. The cure time of the urethane system can be adjusted by adjusting the catalyst levels and exothermic temperatures so as to provide a low cure time, for example, of less than 15 minutes, typically from 10 seconds to 10 minutes.

The urethane resin system has a low viscosity with balanced A and B admixture components which eliminate the need for drum heaters in cool or cold weather and permits the A and B components to be mixed at very low pressure. The urethane resin systems of the invention are designed particularly for use with fixed-volume 1 to 1 volume spray equipment and wherein the viscosity of the A and B components are generally less than 1000 cps at 75° F. and more typically range from about 300 to 600 cps. The urethane resin components may be employed in standard fixed-volume or adjustable volume spray equipment. The urethane resin system may be used alone to form a gel coat without fillers or may be employed over unsaturated polyester cured gel coats to provide improved adhesion to the tacky skin coat of the polyester resin. The sprayable urethane may be used with or without the foaming agents and with or without the fillers or reinforcing materials.

The urethane resin systems of the invention are prepared by reacting A and B side components or admixtures typically in a 1 to 1 volume ratio to form a fast reacting and fast curing urethane resin and wherein the A and B side mixtures may be used by forming a spray coating. The A side mixture comprises a methylene diphenyldiisocyanate (MDI) or an MDI prepolymer. The B side mixture comprises an auto catalytic polyol typically an aromatic amine polyol having a hydroxyl number of generally less than 600 and more typically ranging from about 300 to 600 and a viscosity reducing amount of a tetraethylene glycol both as a reactive polyol and as a viscosity reducer and a catalyst to effect the quick reaction and cure on the admixture of the A and B mixtures. Optionally the reaction mixture, typically on the B side, may comprise a combination of catalysts, foaming agents, flame retardants, fillers, reinforcing agents particularly reinforcing fibers such as chopped fiberglass and very minor amounts of other polyols such as diols like diethylene glycol and triethylene glycol.

The sprayable compositions of the invention are prepared by reacting through spraying together under pressure substantially equal volumes of A and B side mixtures. The A side mixture may comprise a low or high functionality MDI or preferably a prepolymer prepared by the reaction of a MDI and a polyether triol. A low functionality straight MDI is employed on the A side in order to avoid excessive rigidity of the resulting spray coating, where reinforcing materials such as reinforcing fibers particularly chopped glass is employed. However, with the use of the MDI triol prepolymer there is no absolute requirement to employ reinforcing material although in one preferred embodiment, it is desirable to employ chopped glass fibers.

It has been found that high functionality MDI, such as 2.7 or more, e.g. 3.0, provides spray coatings of increased stiffness, but of increased brittleness, so that often reinforcing fibers are required if lower brittleness is desired. Further, with higher functionality MDI there is less tendency to foam. As the functionality of the MDI decreases to a lower functionality MDI, e.g. 2.5 or less, the sprayed coating has a greater tendency to foam. High functionality MDI tends to have a high viscosity which inhibits effective spraying, since a A side viscosity of 700-800 cps or less is preferred, although if desired, the viscosity can be reduced with inert diluents and solvents. Thus, the selection of the MDI functionality for the system depends on the viscosity, degree of foaming tolerated, and the coating property characteristics desired. Prepolymers generally shall be made only with low functionality MDI, 2.7 or less, due to the high viscosity of the resulting prepolymer with high functionality MDI.

The MDI prepolymer is prepared by reacting a polyether triol with a low functionality MDI and generally 100 parts of the prepolymer may be prepared by admixing about 25 to 40 parts for example about 30 to 35 parts of the triol with from about 60 to 75 parts of the low functionality MDI. The components are reacted together for about 1 to 3 hours at 160° to 190° F. and the prepolymer is carefully controlled as regards free NCO, but the prepolymer generally having from about 18 to 25 percent free NCO, e.g. 20 to 23 percent. The MDI employed may be a 4-4 diphenyl methane diisocyanate. Higher percentage NCO-content prepolymer may be used. If additional stiffness is required, however an increase brittleness may result from increased free NCO content. In the preparation of the prepolymer short chain diols may also be used to create a prepolymer of decreased stiffness, but such short chain diols also cause a higher exotherm in the triol prepolymers and also cause viscosity rises. Such diols like diethylene and triethylene glycol should be avoided or only employed in very minor amounts such as about 10 parts or less, for example, less than 5 parts. The preferred triol employed comprises an ethoxylated alkylene oxide triol and particularly an ethoxylated-capped polypropylene oxide generally having a hydroxyl number of about 50 or less, for example about 25 to 50.

The B side mixture typically comprises a combination of a polyol and a catalyst system and optionally may contain other components in minor amounts such as fillers, reinforcing materials, blowing agents, silicones, additional catalysts, stabilizers, inhibitors, viscosity index improvers, dyes, plastercizers, and similar materials. The B side admixture comprises a substantially moisture-free aromatic amine polyol generally having a hydroxyl number ranging from about 300 to 600 and which typically comprises a very viscous liquid-type material. In one embodiment the aromatic amine polyol comprises a managed condensation reaction of a phenol-formaldehyde novolac resin in which the water or moisture has been removed generally to a maximum level of less than 0.1 percent and typically less than 0.05 percent and which has been propoxylated with a tertiary amine group to produce an auto catalytic, aromatic amine polyol which does not require the presence of catalysts to affect a cure. The removal of water provides for increased viscosity ranging typically from 15,000 to 25,000 cps or more and which typically would cause pumping problems in connection with its use in spray equipment. The phenolic novolac resin employed generally is a reaction of formaldehyde and phenol with excess phenol or later by the addition of hexamine as a cross-linking agent to provide a one stage novolac resin which is then involved in a managed condensation reaction with the amine. The aromatic amine polyol if reacted alone with the MDI or the MDI prepolymer in the A component produces a very brittle spray-type particle with poor adhesion to the unsaturated polyester gel coat. Therefor, the B side mixture also comprises an adhesion-promoting and viscosity-reducing amount of a polyol which typically is a glycol and which has a hydroxyl number which is approximately the number of the aromatic amine polyol employed on the B side and generally within at least 50 hydroxyl numbers on either side of the aromatic amine polyol.

It has been found that the addition of a viscosity reducing amount ranging from about 5 to 50, typically 10 to 35 parts of tetraethylene glycol is a preferred viscosity reducing polyol, since the tetraethylene glycol has a hydroxyl number generally from about 530 which approximates the hydroxyl number of 530 of a commercial aromatic amine polyol. Thus, in combination, the employment of the aromatic amine polyol and the tetraethylene glycol reduces considerably the brittleness of the resulting product, provides for increased adhesion of the sprayed coating to the polyester gel coat and reduces the viscosity to a spray or pumpable viscosity and in addition and importantly, provides for wetting out the reinforcing fibers such as the fiberglass gun roving material.

In the selection of the components because the exterior gel coats employed tend to be brittle, it is often essential to create a sprayed product over a gel coat having a hardness of greater than about 80 shore D and a flexible modulus of greater than 100,000. When employing the sprayable coating over a unsaturated resin gel coat, even though it has been cured a volatile styrene monomer is being removed from the gel coat during the cure which tends to interfere with a urethane reaction where a standard reaction injection molding (RIM) urethane material is not satisfactory over the polyester gel coat while the present sprayable urethane resin is very satisfactory. In the B side, as in the A side preparation of the prepolymer, very minor amounts of diols may be employed such as diethylene glycol, triethylene glycol, 1,4 butane diol; however, such diols, because of the high hydroxyl number or the tendency to exothermic reactions, increase in viscosity and the increase in brittleness of the resulting fabricated product if employed should be employed in very minor amounts for specific reasons of formulation.

The B side mixture also comprises a catalyst system even though the aromatic amine is auto catalytic in order to increase the reaction rate and reduce the cure time. The amount and nature of the catalyst system may vary as desired, but generally comprises from about 0.005 to 2 parts and more generally 0.01 to 1 part, such as 0.03 to 0.1 part to 1 part per 100 parts of the polyol in the B side mixture. The catalyst typically comprises a organo-metallic catalyst such as a tin catalyst or a tetravalent tin catalyst such as an alkyl-fatty acid tetravalent tin catalyst, such as a dialkyl, difatty acid tin and more particularly a dibutyl dilauryl tin catalyst in combination with the auto catalytic aromatic amine polyol.

The selection of the catalyst system is essential since the catalyst system must allow the urethane resin to wet out on the reinforcing material or therefor no strength is gained from the use of the reinforcing material. The catalyst system must provide for a fast gel without prefoaming and produce a rapid, cured, tack free coating. Catalyst systems which have a tendency to create a blowing action should not be employed, since the low moisture or substantially moisture-free aromatic amine polyol is auto catalytic. It has been found that a small amount of a tetravalent tin catalyst is preferred for use for increased reactivity at low levels; for example, less than 0.1 parts on the B side.

It has been found that increased tetravalent tin levels tend to cause foaming which may be undesirable; and therefor, another selected catalyst would comprise a lead catalyst system such as an organo lead catalyst and more particularly a aromatic lead such as a lead napthenate catalyst. The employment of a lead catalyst provides for fast reactivity at very small levels of less than 0.1 part on the B side without foaming, since where foaming is undesirable optionally small amounts of an antifoam material or degassing material such as a silicone material should be employed such as in the amount ranging from 0.05 to 2 parts and more typically 0.1 to 0.5 parts of a degassing or antifoam silicone polymer.

Fiberglass fabricated products in most cases must comply and meet various government standards which comprise biotest gel coating, adhesion test, and deflection test. The employment of various filler and flame retardant materials in the urethane resin should be employed to meet various government tests and standards and to make the urethane resin more cost competitive with unsaturated or with polyester resins. It is desirable to employ flame retardants, fire suppressors, and fillers with low moisture content so as not to provide undesirable foaming. In order to provide flame retardants and flame supression to meet various fire and flame tests, it has been found desirable to employ various flame retardant additives generally up to about 30 percent by weight; for example, 5 to 25 percent by weight of the urethane resin. Such flame retardants may comprise for example phosphates, chlorinated compounds, and chlorinated phosphates.

More particularly it has been found that the employment of low moisture-content aluminum trihydrate added to the urethane resin permits the fabricated spray finish product to meet fire standards with a substantial cost reduction over standard flame retardants such as chlorinated phosphates, although chlorinated phosphates and other flame retardants may be used if desired. Where aluminum trihydrate is employed it is important that the moisture level is low to prevent undesirable blowing and that the material be added to the B side to improve fire properties.

In addition to fillers employed for the use of flame and fire tests, it is also desirable to employ filler and reinforcing material for cost reduction and to provide greater structural strength and to avoid brittleness. Such fillers, of course, may be added to the B side and sometimes to the A side or often with the use of reinforcing fibers such as glass fibers may be introduced such as chopped form directly into the spray reaction pattern created in the spraying operation to avoid undesirable increases in viscosity on the B side and to prevent problems associated with plugging of the spray nozzles. The fillers may generally be used up to about 30 percent by weight of the urethane resin and generally from 5 to 25 percent and may include various materials such as talc, metal oxide, clays, fibers (both natural and synthetic) diatomaceous earth, carbon black and similar filler materials both treated and untreated.

It is expensive to increase the thickness of the sprayed coating generally with many solid filler type materials, so that it has been discovered that the coating material may be reduced from the generally solid density of 60 to 70 pcf to a lower range of about 30 pcf or more density such as about 30 to 45 by incorporating into the B side various additives which contain minor amounts of moisture to provide for control foaming. For example, it has been found effective to incorporate minor amounts of a metal oxide such as titanium dioxide on the B polyol side. Such a metal oxide like titanium oxide is used to allow small amounts of internal moisture within the titanium oxide to result in slight foaming of the resin after spraying and to add desirable thixotropic characteristics.

It has been found desirable to employ titanium dioxide or a metal oxide, such as zinc oxide, magnesium oxide, and the like up to about 12 percent by weight more typically 8 to 12 percent added to the B side polyol mixture. The employment of such metal oxide slows reactivity; therefor, additional catalysts may often be added to compensate for slowed reactivity. Use of metal oxide produces a white-type product with slight foaming resulting from internal moisture reducing the density of the sprayed coating. The exotherm from the reaction is often sharply reduced while the urethane cling properties increased. Other products such as a needle like mineral filler to provide increases in strength and flexible modulus may be added such as mica-type needles.

It is often desired to provide for increased thickness by controlled foaming of the urethane resin to provide a product of generally more than 25 pcf density by the use of very small and controlled amounts of a blowing agent. Typically a blowing agent would comprise very small amounts of moisture which may be inherently present in the components or be added in small controlled amounts generally not more than 1 percent by weight or one part of the B side polyol which may be present. In addition, chemical type blowing agents may be employed to provide controlled blowing, while the use of typical liquid halo carbon blowing agents such as fluoro or carbon or fluorochlorocarbon blowing agents are difficult to employ since it is difficult to obtain very high densities above 30 pcf with the use of halo carbons or methylene chloride or other liquid-type blowing agents. Thus, it is desirable to employ chemical type blowing agents which will generate nitrogen, oxygen, carbon dioxide or other gases in small controlled amounts.

It has been found that the use of various peroxides added to the B side mixtures are effective in reducing density in a controlled manner and which peroxides tend to generate oxygen to provide for slight foaming during the exothermic reaction on spraying of the products. The peroxide compound should be selected such as the oxygen will be generated at the desired or below the desired exotherm temperature. It has been found that an organic peroxide such as a methyl ethyl ketone peroxide is satisfactory for incorporation in the B side. Typically the peroxide is used in amounts ranging from about 0.1 to 3 parts and more generally from 0.5 to 2 parts in the B side. As the peroxide material heats up during reaction oxygen is generated from the peroxide material to act as a control foaming agent.

Where a peroxide is employed as a blowing agent the lead catalyst or another organo-metallic catalyst should be used rather than tin, since the peroxide tends to make the tin catalyst inactive. Thus, the selection of the proper catalyst is desirable with the employment of organo peroxide materials. As with the metal oxide, the addition of peroxide may slow down the reaction slightly so increased catalyst levels may be desired. The use of a halo carbon such as a fluoro chloro methane or ethane or the liquid agent may be added to the B side or A side or the liquid material injected directly into the reaction zone between the spray nozzles. However, the foam density is difficult to control and the amount of the halo carbon to be used typically should be low, such as less than about 10 weight percent of the urethane resin, typically 1 to 5 percent. Thus, the blowing agent may comprise a metal oxide containing internal moisture, small amounts of water, small amounts of halo carbon or a chemical blowing agent such as a peroxide, the resulting spray coating with or without fillers or glass show a reduction in density with a slight increase in thickness and with increased stiffness.

The reaction mixtures of A and B are generally sprayed together in conventional spraying equipment, but preferably in 1 to 1 volume fixed-spray such as in Glas-Craft spray equipment. The spray conditions generally employ primary heaters ranging from about 120° to 160° F. and hose heaters generally ranging from about 100° to 140° F. and with spray pressures employed of greater than 300 and typically 1000 to 2000 psi. The A and B side mixtures are intimately mixed and exit from separate nozzles and react in a spray form. Generally a reinforcing fiber such as chopped glass fiber rovings are reduced directly through air spray into the sprayed reaction mixture, so as to be incorporated and be wetted intimately with the mixture immediately prior to reaction and with the reaction. The viscosity of the A and B sides generally should be less than 1000 cps and generally less than 600 cps. On spraying, the exotherm is generally 260° F. exotherm or less generally ranging from 225° to about 250° F., the resulting product provides for excellent stiffness, slight foaming and no excessive brittleness. Where the prepolymer has a lower percent NCO generally below 23; for example 18 to 23 percent, the sprayed coating is an excellent coating with a durometer of less than 80 shore D scale, but also remains flexible and which flexible material is suitable for use in making auto bumpers and for use in marine uses, such as for fabrication of boats and boat hulls and marine parts.

The sprayed material also may be employed as a spray roof or wall coating particularly directly on metal where flexibility is important, so that no cracking appears during movement of the metal wall or roof. As described the spray urethane resin material may be sprayed directly onto a styrene polyester gel coat while fully cured or in a tacky condition to provide excellent adhesion to the polyester gel coat or may be employed first as an exterior coat and then later an additional coating with the reinforcing fibers employed on top of the coat. The sprayed urethane resin components of the invention rapidly cured and do not require rolling of the fiberglass into the gel coat and increases productivity due to increased cure rates and saves on labor due to the avoidance of the necessity of rolling the material to provide a wetting of the fiber glass or fiber glass matting into the gel coat.

The preferred method of forming a foam coating is by spraying the A and B side mixtures together. However, it is recognized that a urethane resin may be formed by reacting together the A and B side mixtures by techniques other than spraying, such as by rapidly mixing the mixtures together for use as molding-type resins. Due to the generally fast reaction time, forming a coating by spraying the mixtures together onto a substrate is the preferred method of reaction.

A typical formulation of a sprayable urethane resin is set forth below.

| TYPICAL FORMULATIONS | | |
|---|---|---|
| | Parts By Weight | |
| | General | Preferred |
| *A MIXTURE | | |
| MDI or MDI-triol prepolymer | 100 | 100 |
| *B MIXTURE | | |
| Aromatic amine polyol | 50–95 | 50–75 |
| Tetraethylene glycol | 5–50 | 10–35 |
| Triol (optional) | 0–10 | 0–5 |
| Blowing agent (optional) e.g. H$_2$O - Peroxide or halocarbon polymer** | 0–11 | 0.5–2 |
| Antifoam (optional) e.g., silicone | 0–2 | 0.1–0.5 |
| Filler (optional) metal oxide e.g. T$_i$O$_2$ | 0–40 | 5–15 |
| Flame retardant - e.g., Aluminumtrihydrate | 0–30 | 5–25 |
| Reinforcing material - glass fiber sprayed onto reaction | 0–30 | 5–25 |

*Adjust to equal-volume A and B mixtures
**Can be added to A side mixture

The invention will be described for the purposes of illustration only in connection with certain embodiments; however, it is recognized that those persons skilled in the art may make various changes additions and improvements to such described embodiments all falling within the spirit and scope of the invention.

Description of the Embodiments

EXAMPLE 1

A high modulus sprayable composition was prepared as follows:
A mixture:
122 parts MDI, functionality 2.7 (Upjohn 1245)
B mixture:
100 parts aromatic amine polyol (BET 530 of Union Carbide Corporation), Viscosity 25,000 cps.

The A and B side mixture was mixed and sprayed on a Glas-Craft fixed-volume spray equipment with the primary heater at 160° F., the hose temperature at 140° F. and the pressure about 1,200 psi. The reactivity of the resulting product was 3 minutes to gel and 5 minutes to a tack-free product with the exotherm at about 250° F. at a thickness of ¼ inch. The resulting product was brittle and exhibited slight foaming.

EXAMPLE 2

The sprayable urethane resin coating composition of the invention was prepared employing the following formulation:
A mixture:
100 parts MDI functionality 2.7 (Upjohn 1245)
B mixture:
70 parts aromatic amine polyol hydroxyl number 530 (BET 530 Union Carbide Corporation)
30 parts tetraethylene glycol
0.05 parts tetravalent tin, dibutyl dilaureate.

The material was sprayed in the same manner as in Example 1 having no pumping problems associated with viscosity were found, since the viscosity of the B side was approximately 500 cps at 75. The resulting product had excellent stiffness but very slight foaming and no brittleness. Using a flat spray pattern, chopped fiberglass rovings were introduced into the spray in amounts of 15 and 25 percent. The resulting physical properties of the product of the invention are approximately as follows:

resin gel coat to improve adhesion thereafter spraying the additional coating with the chopped fiberglass onto the gel coat.

EXAMPLE 3

A sprayable urethane formulation of the invention is prepared employing the B side mixture of Example 1 and employing a A side mixture of a prepolymer made by reacting for 3 hours at 180° F. about 30 parts of triol E474 hydroxyl number 35 by Union Carbide Corporation with 70 parts of MDI having a functionality of 2.7 to provide a prepolymer having 23.5 percent free NCO groups. Spray coating of the mixture using a flat spray with the introduction of about 15 to 25 percent chopped fiberglass rovings will provide a reinforced, flexible spray coating suitable for use over a polyester gel coat or to be sprayed on the metal roofing.

EXAMPLE 4

The spray urethane resin formulation of Example 2 was repeated, but 1 part of antifoam silicone material was added, (5304 Union Carbide Corporation) and the resulting fabricated product did not shows any foaming.

EXAMPLE 5

The sprayable urethane formulation of Example 2 was repeated employing 1 part of the antifoam silicone material and employing lead napthenate as the catalyst rather than the tetravalent tin in an amount of 0.015 parts of lead napthenate. The resulting product had a better reactivity and cure time than Example 4 and a better gel and less running on vertical surfaces where sprayed.

EXAMPLE 6

The sprayable urethane formulation of Example 5 was employed except the prepolymer as prepared in Example 2 was employed in place of the MDI and the resulting sprayed product coating was more flexible with good hardness.

| TEST | PHYSICAL PROPERTIES ASTM METHOD | % GLASS 0 | 15 | 25 |
|---|---|---|---|---|
| Hardness Shore D | D-2240 | 66 | 72 | 72 |
| Density gm/cc | D-792 | 1.131 | 1.237 | 1.25 |
| Flexural Modulus PSI | | | | |
| +75° F. | D-790 | 119,200 | 188,200 | 244,700 |
| −20° F. | | 211,600 | 348,800 | 454,800 |
| +158° F. | | 55,840 | 60,390 | 106,400 |
| Tensile Strength | | | | |
| @ break PSI | D-412 | 2580 | 2900 | 3370 |
| @ yield PSI | | 2350 | 2480 | 3240 |
| % elongation @ break | D-412 | 160 | 80 | 40 |
| Notched izod impact ft/lbs/in. | D-256 | 14.3 | 6.2 | 49 |
| Heat sag @ 250° F. for 1 hr. inches | | 0.29 | 0.18 | 0.16 |
| Coefficient of Thermal Expansion in/in/0° F. | | $89.4 \times 10^{-6}$ | $58.9 \times 10^{-6}$ | $28.1 \times 10^{-6}$ |
| Abrasion Resistance Taber Method @ 5000 cycles | D-3884 | 1.72% loss | | |
| Humid Aging 2 wks 100% RH @ 7 days @ 158° F. | D-2126 | 0.3% Vol | | |
| Weatherometer Xenon Arc 1000 hrs Fadometer Exposure | D-2569-79 | no surface crazing or cracking discoloration to yellow tan | | |

The formulation of Example 2 is sprayed over a tacky skin coat of a styrene monomer unsaturated polyester

EXAMPLE 7

Example 5 was repeated except that 5 parts of a titanium dioxide was added to the B side mixture as a foaming agent and filler, the resulting product was similar in properties as to Example 5 except due to foaming the coating had a density of approximately 45 pcf instead of 65 pcf as in Example 5.

EXAMPLE 8

Example 7 was repeated except that 1.5 parts of a methyl ethyl ketone peroxide was added to the B side mixture as a control foaming agent, the product resulting was the same as in Example 5 except that the product had a density of approximately 30 pcf.

EXAMPLE 9

Example 5 was repeated except that a flame retardant amount of aluminum trihydrate having very low moisture content in the amount of 40 parts was added to the B side, the resulting product was the same as in Example 5 except that the product exhibited nonburning and excellent flame retardant characteristics.

EXAMPLE 10

Examples 2 and 3 employing various reinforcing low cost fillers such as for example kaolin and clay, calcium carbonate, metal fillers, metal oxides provide for a low cost polyester resin competitive urethane resin sprayable coating which exhibits good flexibility, low brittleness and are sprayed directly onto a substrate or over a tack free gel coat of a unsaturated polyester resin.

EXAMPLE 11

A sprayable composition of the invention was prepared as follows:
A Mixture:
100 parts MDI functionality 3.0 (Upjohn 580)
B Mixture:
80 parts aromatic amine polyol (BET 530)
20 parts tetraethylene glycol
10 parts flame retardant (Antiblaze 80—trichloroethyl phosphate (Mobil Chemical Co.)
0.02 catalyst lead napthenate The composition when sprayed with chopped glass roving introduced into the spray in fixed-volume spray equipment produced a fairly still sprayed coating with good adhesion to a polyester resin gel coat.

EXAMPLE 12

Example 11 was repeated, however, to obtain a more flexible sprayed coating 10 parts of the tetraethylene glycol was replaced with 10 parts of an ethoxylated polyether triol (E474) to provide 10 parts of TEG and 10 parts triol.

The employment of low amounts of triol produced a lower reaction exotherm and provided a more flexible sprayed coating and reduced the brittleness of the sprayed coating of example 11. The use of up to about 10 parts of a triol in the B side mixture where a high functionality MDI, e.g. over 2.7 MDI is used on the A side reduces the exotherm and the brittleness of the sprayed cured coating.

What is claimed is:

1. A process of preparing a urethane resin composition which process comprises reacting together an A mixture and a B mixture to form a fast reacting and curing urethane resin;
   (a) the A side mixture comprising MDI or an MDI prepolymer prepared by the reaction of an MDI having a functionality of about 3.0 or less with a ethylene oxide-capped polypropylene oxide triol having a hydroxyl number of about 50 or less, the prepolymer having from about 18 to 25 percent free NCO groups; and
   (b) a B side mixture which comprises:
      (i) from about 50 to 95 parts of an auto catalytic, aromatic amine polyol;
      (ii) from about 5 to 50 parts of a tetraethylene glycol; and
      (iii) a small catalytic amount of an organo-metallic catalyst selected from the group consisting of tetravalent tin or lead to provide for a gel time of less than 15 minutes.

2. The process of claim 1 wherein the MDI comprises a functionality of from about 2.0 to 2.7.

3. The process of claim 1 wherein the MDI prepolymer is prepared by including up to about 5 parts per 100 parts of the MDI of a diol.

4. The process of claim 1 wherein the auto catalytic aromatic amine polyol comprises a substantially moisture-free phenol-formaldehyde novolac resin which has been propoxylated with a tertiary amine and which has a hydroxyl number of from about 300 to 600.

5. The process of claim 1 wherein the auto catalytic, aromatic amine polyol has a hydroxyl number of from about 300 to 600.

6. The process of claim 1 wherein the tetraethylene glycol is added in an amount sufficient to provide for a B side mixture having a viscosity of about 1000 cps or less at 75° F.

7. The process of claim 1 wherein the catalyst comprises from about 0.001 to about 1 part of the organo-metallic catalyst.

8. The process of claim 7 wherein the catalyst comprises dibutyl dilauryl tin or lead napthenate.

9. The process of claim 1 which comprises spraying equal volumes of the A and B side mixture together as a sprayable coating composition onto a substrate.

10. The process of claim 1 which includes reacting the A and B side components by spraying the A and B side components together onto a gel coat of a polyester resin.

11. The process of claim 1 which includes a small blowing amount of an organic heat-composable peroxide to provide for a foamed urethane resin having a density of from about 30 to 65 pcf.

12. The process of claim 1 which includes adding up to about 15 percent by weight of a titanium dioxide filler material on the B side.

13. The process of claim 1 which includes adding up to about 40 parts by weight of a filler material to the B side mixture.

14. The process of claim 1 which includes incorporating up to about 30 percent by weight of chopped fiberglass as a reinforcing material in the reaction.

15. The process of claim 13 which includes spraying the equal volumes of the A and B side mixtures together to provide a reactive mixture and introducing into the sprayed reaction a reinforcing amount of chopped fiberglass roving material.

16. The process of claim 1 which includes adding up to about 10 parts by weight of a polyether triol to the B side mixture.

17. The process of claim 1 which includes adding to the B side mixture up to about 6 parts by weight of a liquid halocarbon blowing agent.

18. The process of claim 1 which includes incorporating into the reaction mixture a flame or fire supressive amount of a flame retardant compound.

19. The process of claim 18 wherein the flame retardant material comprises low-moisture content aluminum trihydrate.

20. The process of claim 1 wherein the A or B side contains a small control amount of moisture to act as a blowing agent and wherein the resulting product has a density of greater than about 30 pcf.

21. The cured urethane reaction compound produced by the process of claim 1.

22. The cured foam urethane reaction resin produced by the process of claim 1 having a density of from about 30 to 45 pcf.

23. The cured reaction urethane resin product produced by the process of claim 1 and which contains up to about 30 percent by weight of reinforcing fiberglass.

24. A process of preparing a urethane resin composition which process comprises spraying and reacting together substantially equal volumes of an A mixture and a B mixture to form a fast reacting and curing urethane resin;
(a) the A side mixture comprising MDI or an MDI prepolymer prepared by the reaction of a low functionality MDI having a functionality of 2.0 to 3.0 with a ethylene oxide-capped polypropylene oxide triol having a hydroxyl number of about 50 or less, the prepolymer having from about 18 to 25 percent free NCO groups; and
(b) a B side mixture comprising:
  (i) about 50 to 95 parts of a low moisture, auto catalytic, aromatic amine polyol having a hydroxyl number of about 300 to 600, the aromatic amine polyol being a propylated phenol-formaldehyde novalac amine compound;
  (ii) from about 5 to 50 parts of tetraethylene glycol;
  (iii) a small catalytic amount of an organo-metallic catalyst selected from the group consisting of tetravalent tin or lead to provide for a gel time of less than 15 minutes; and
  (v) which contains a blowing amount of a heat decomposable organic peroxide material to provide a product having a density of from about 30 to 65 pcf.

25. The process of claim 24 which includes introducing from about 5 to 25 percent by weight of fiberglass as a reinforcing material into the sprayed reaction zone.

26. The process of claim 24 which includes in the B side mixture up to 30 parts by weight of a low-moisture content metal oxide particulate oil filler material.

27. The process of claim 24 which includes in the B side mixture up to 10 parts of a polyether triol.

28. The sprayed glass fiber reinforced urethane resin product produced by the process of claim 23.

* * * * *